(12) United States Patent
Barmichev et al.

(10) Patent No.: US 8,220,741 B2
(45) Date of Patent: Jul. 17, 2012

(54) SYNTHETIC AISLE CONFIGURATION FOR AN AIRCRAFT

(75) Inventors: Sergey D. Barmichev, Bothell, WA (US); David W. Eckert, Marysville, WA (US)

(73) Assignee: The Boeing Company, Chicago, IL (US)

( * ) Notice: Subject to any disclaimer, the term of this patent is extended or adjusted under 35 U.S.C. 154(b) by 1037 days.

(21) Appl. No.: 12/147,731

(22) Filed: Jun. 27, 2008

(65) Prior Publication Data

US 2009/0321565 A1 Dec. 31, 2009

(51) Int. Cl.
*B64D 11/06* (2006.01)
(52) U.S. Cl. ..................................... 244/118.6; 105/319
(58) Field of Classification Search .............. 244/117 R, 244/119, 118.5, 118.6; 105/319; 297/107
See application file for complete search history.

(56) References Cited

U.S. PATENT DOCUMENTS

| | | | |
|---|---|---|---|
| 4,382,628 A | | 5/1983 | Palmgren |
| 4,674,712 A | * | 6/1987 | Whitener et al. ............. 244/119 |
| 4,828,204 A | * | 5/1989 | Friebel ...................... 244/117 R |
| 5,086,996 A | * | 2/1992 | Roeder et al. ................. 244/119 |
| 5,611,503 A | * | 3/1997 | Brauer ....................... 244/118.6 |
| 6,059,364 A | | 5/2000 | Dryburgh et al. |
| 7,077,360 B2 | | 7/2006 | Jacob |
| 7,252,268 B2 | | 8/2007 | Saint-Jalmes |
| 7,252,332 B2 | * | 8/2007 | Thompson ................... 297/248 |
| 7,320,446 B2 | | 1/2008 | Saint-Jalmes et al. |
| 7,578,551 B2 | * | 8/2009 | Linero ......................... 297/107 |
| 2006/0102785 A1 | * | 5/2006 | Butt .......................... 244/118.6 |
| 2006/0214057 A1 | * | 9/2006 | Saint-Jalmes et al. ..... 244/118.6 |

* cited by examiner

*Primary Examiner* — Galen Barefoot
(74) *Attorney, Agent, or Firm* — Yee & Associates, P.C.

(57) ABSTRACT

A method may be present for configuring an aircraft. A design may be identified for the aircraft. A passenger area may be configured using a set of synthetic aisles to meet a desired passenger density for the design.

21 Claims, 17 Drawing Sheets

FIG. 23

| | IN/SEAT | (1-h/w)*100% | AREA(sq.ft) |
|---|---|---|---|
| FIGURE 20 | 85.30 | -5.9 | 144.9 |
| FIGURE 21 | 81.87 | 8.0 | 181.1 |
| FIGURES 22A AND 22B | 81.81 | 2.7 | 156.0 |

2300, 2302, 2304, 2306, 2308, 2309, 2310, 2311, 2312, 2313

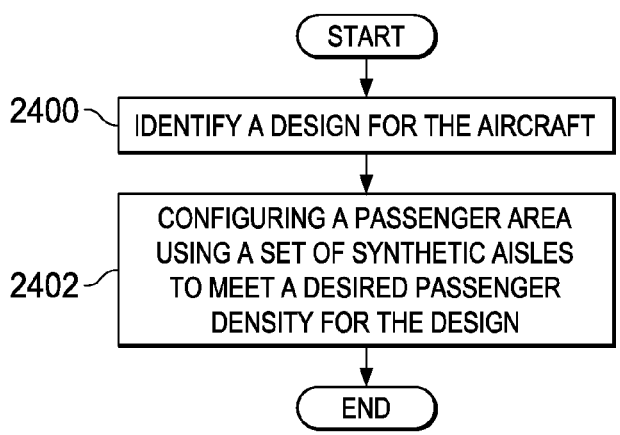

FIG. 24

START → IDENTIFY A DESIGN FOR THE AIRCRAFT (2400) → CONFIGURING A PASSENGER AREA USING A SET OF SYNTHETIC AISLES TO MEET A DESIRED PASSENGER DENSITY FOR THE DESIGN (2402) → END

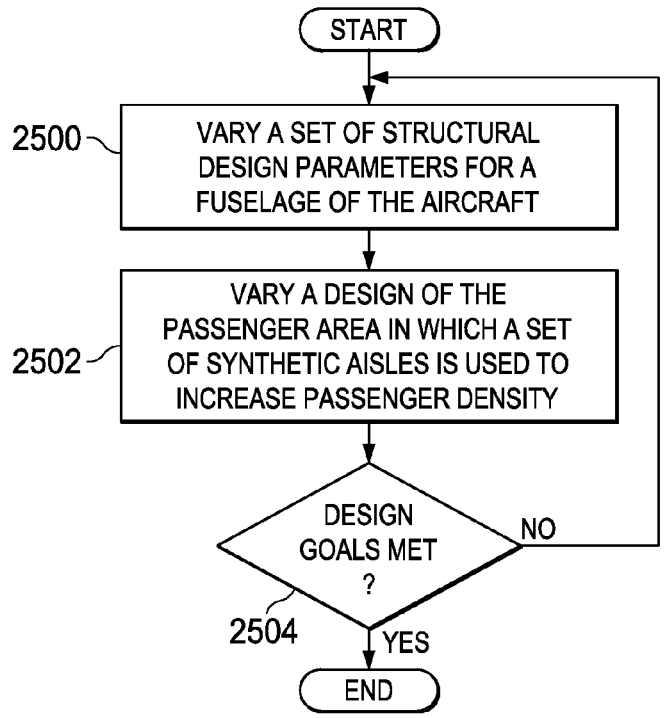

FIG. 25

START → VARY A SET OF STRUCTURAL DESIGN PARAMETERS FOR A FUSELAGE OF THE AIRCRAFT (2500) → VARY A DESIGN OF THE PASSENGER AREA IN WHICH A SET OF SYNTHETIC AISLES IS USED TO INCREASE PASSENGER DENSITY (2502) → DESIGN GOALS MET? (2504) — NO (loop back); YES → END

SYNTHETIC AISLE CONFIGURATION FOR AN AIRCRAFT

BACKGROUND INFORMATION

1. Field

The present disclosure relates generally to manufacturing and in particular to manufacturing aircraft. Still more particularly, the present disclosure relates to a method and apparatus for configuring a passenger area in an aircraft.

2. Background

An aircraft may include an aircraft cabin, which may be a section of the aircraft in which passengers travel. In commercial aircraft, an aircraft cabin may be divided into several parts. These parts may include, for example, without limitation, passenger areas, areas for flight attendants, a galley, storage for in-flight service, and other suitable sections. Seats within the passenger area may be arranged in rows and alleys. The amount of space provided on a per passenger basis may increase with the presence of a higher travel class. Different passenger areas for different travel classes may be divided using curtains and/or monuments.

In designing a passenger area for an aircraft, it may be desirable to maximize the passenger density. In other words, it may be desirable to fit as many passengers as possible within a passenger area, while meeting various requirements for passenger seating. These requirements may include, for example, without limitation, a certain passenger space based on a class of travel, as well as based on safety regulations.

In developing a commercial aircraft, changes may occur in fuselage proportions. Currently, in designing an aircraft, insufficient space may be present to optimize a fuselage size in terms of design parameters such as, for example, without limitation, drag and weight.

Current solutions may involve changing parameters such as, for example, without limitation, fuselage shape and structure manipulations. These solutions may violate an optimal aerodynamic shape and add structural weight.

Therefore, it would be advantageous to have an approved method and apparatus for configuring a passenger area within an aircraft, which solves some or all of the limitations discussed above.

SUMMARY

In one advantageous embodiment, a method may be present for configuring an aircraft. A design may be identified for the aircraft. A passenger area may be configured using a set of synthetic aisles to meet a desired passenger density for the design.

In another advantageous embodiment, a method may be present for configuring an aircraft. A set of structural design parameters may be varied for a fuselage of the aircraft. A design of a passenger area may be present in which a set of synthetic aisles are used to may be varied to increase passenger density.

In yet another advantageous embodiment, a vehicle may comprise a fuselage, a passenger area within the fuselage, a plurality of seats in the passenger area, and a synthetic aisle in the passenger area.

In still another advantageous embodiment, a method may be present for configuring an aircraft. A design may be identified for the aircraft. A passenger area may be configured by selecting a sequence of seats and spaces for a set of synthetic aisles to meet a desired passenger density for the design based on a policy. The policy may specify at least one of a maximum time to reach an exit from any seat within the passenger area, a pitch for seats, a seat width, and an orientation for seats. A configuration of the seats and the set of synthetic aisles in the passenger area may be described using a discrete aisle code. The desired passenger density may be one of a selected density and the maximum passenger density for the design on the aircraft.

In another advantageous embodiment, a method may be present for configuring an aircraft. A set of structural design parameters for a fuselage of the aircraft may be varied to meet a set of performance parameters. A design of a passenger area in which a set of synthetic aisles are used may be varied to increase passenger density. The passenger area may have a set number of seats. The set of performance parameters may include at least one of an amount of drag on the fuselage, a shape of a cross section of the fuselage, a perimeter of the fuselage, and an area of a cross section of the fuselage. A configuration of seats and the set of synthetic aisles in the passenger area may be described using a discrete aisle code.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 23 is a table illustrating a comparison of data for different cross-sections using different types of aisles in accordance with an advantageous embodiment;

FIG. 24 is a flowchart of a process for configuring a passenger area in accordance with an advantageous embodiment; and FIG. 25 is a flowchart of a process for designing an aircraft in accordance with an advantageous embodiment.

DETAILED DESCRIPTION

Figure 1:
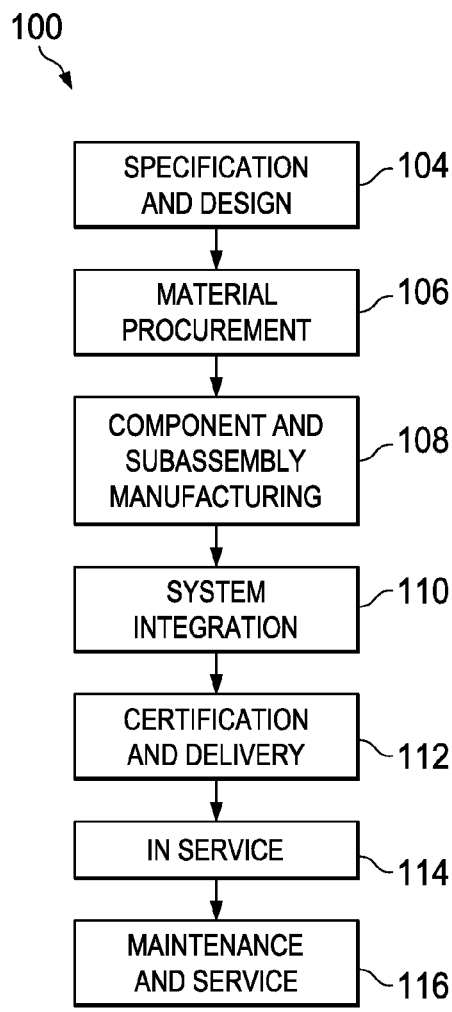
FIG. 1 is a flow diagram of an aircraft production and service methodology in accordance with an advantageous embodiment.
Figure 2:
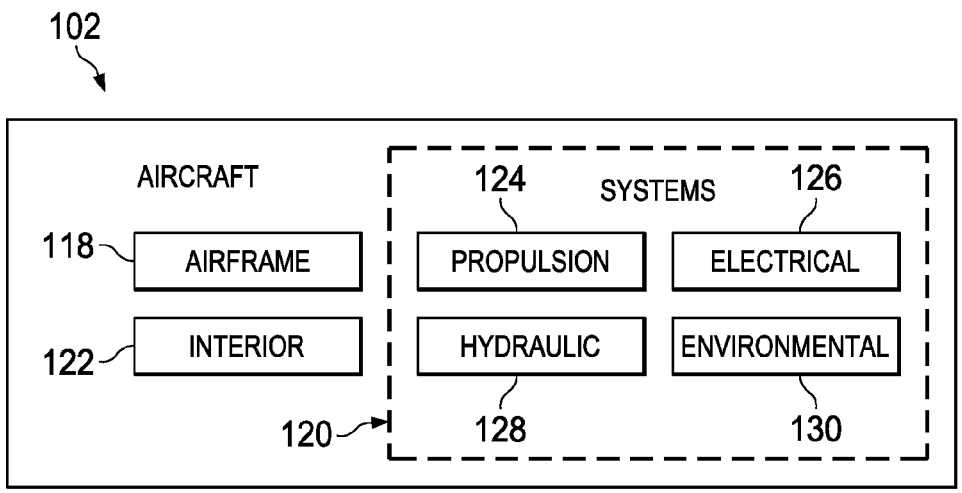
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and an aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116. For example, the different advantageous embodiments may be used during specification and design 104 to design passenger areas. Additionally, other advantageous embodiments may be used during maintenance and service 116 to reconfigure or change passenger areas.

The different advantageous embodiments recognize and take into account that the currently used solutions for optimizing passenger seating may result in fuselage shapes that may not provide a desired level of aerodynamic performance. For example, without limitation, the drag on the fuselage may be greater than desired when designing a fuselage shape to optimize passenger seating.

Further, the different structure manipulations that may be required for different fuselage shapes in designing passenger seating areas may add structural weight. For example, without limitation, when the cross-section of the fuselage increases in deviation from a circle, additional structures and additional reinforcement of structures may be required. With currently used design methodologies, commercial aircraft in the same passenger range may have the same or similar passenger layout.

The different advantageous embodiments provide a method and apparatus for designing a passenger area that may be more flexible and provide greater passenger space for all types of aircraft. These layouts may allow for the optimization of the fuselage design to meet various performance parameters. The different advantageous embodiments may identify a design for an aircraft and configure a passenger area using a set of synthetic aisles to meet a desired passenger density for the design. As used herein, a set refers to one or more items. For example, without limitation, a set of synthetic aisles may be one or more synthetic aisles.

Further, the different advantageous embodiments may configure an aircraft by varying a set of structural design parameters for a fuselage of the aircraft. The design of the passenger area may include a set of synthetic aisles to increase passenger density. This design may be varied to provide optimization in at least one of the set of structural design parameters and the passenger density.

As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C.

In other words, the different advantageous embodiments may provide a desired passenger area design and/or configuration to meet a desired passenger density. Further, the different advantageous embodiments also may achieve the desired passenger configuration with better performance than currently used methods. This increased performance may include better drag and weight values for the aircraft.

Figure 3:
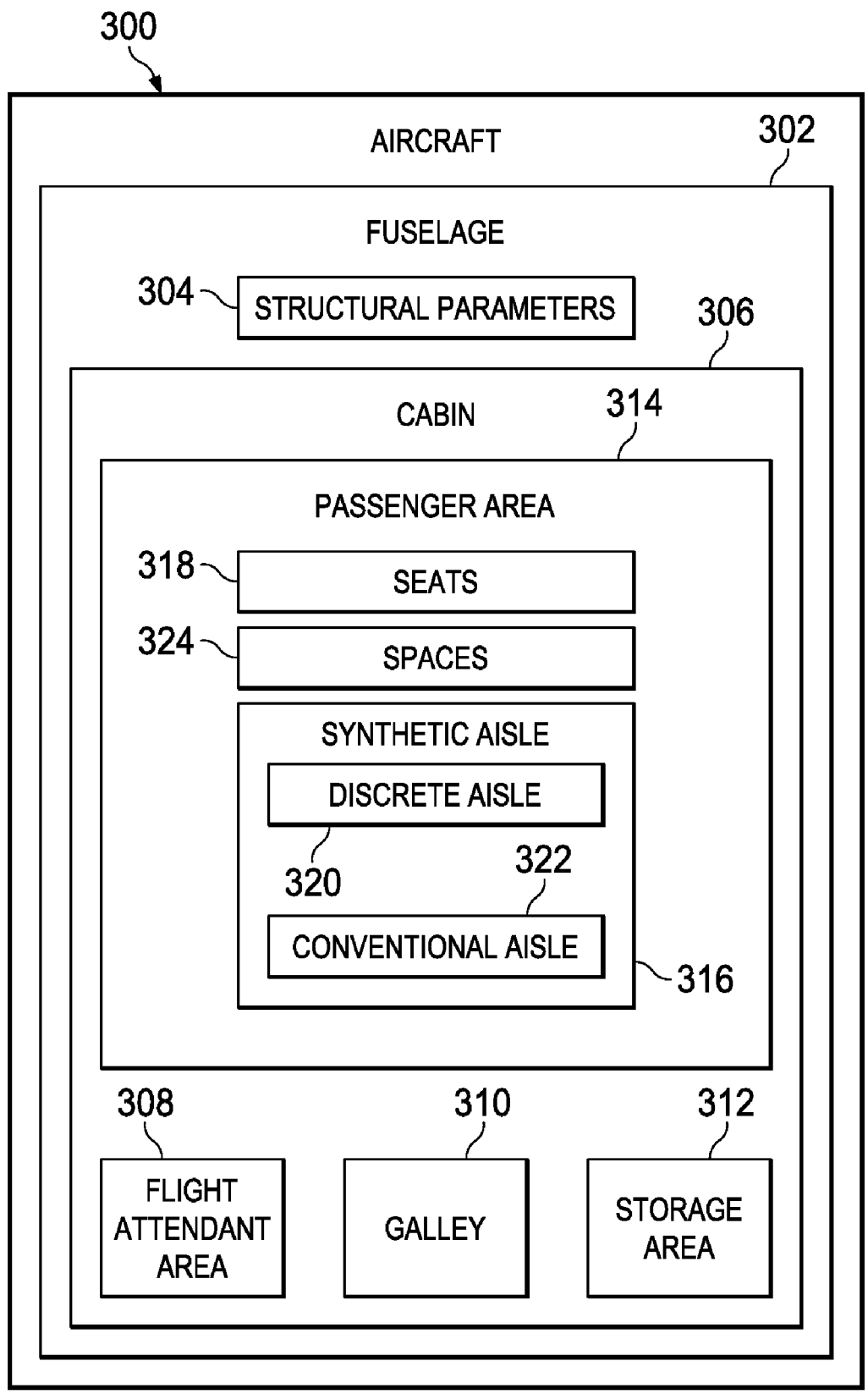
FIG. 3 is a block diagram illustrating an aircraft in accordance with an advantageous embodiment.

With reference now to FIG. 3, a block diagram illustrating an aircraft is depicted in accordance with an advantageous embodiment. In this example, aircraft 300 includes fuselage 302 and may have structural parameters 304. These structural parameters include, for example, without limitation, weight, area of the fuselage cross-section, perimeter of the fuselage, shape of the cross-section of the fuselage, structural reinforcements, and other suitable parameters.

In these examples, cabin 306 may be found within fuselage 302. Cabin 306 may include various areas. These areas may include, for example, without limitation, flight attendant areas 308, galley 310, storage area 312, and passenger area 314. In the different advantageous embodiments, passenger area 314 may be configured to provide a desired passenger density with respect to structural parameters 304 and fuselage 302.

In the different advantageous embodiments, passenger area 314 may include synthetic aisle 316 and seats 318. Depending on the particular implementation, multiple aisles may be found in passenger area 314. In these examples, synthetic aisle 316 may be a combination of discrete aisle 320 and conventional aisle 322. Synthetic aisle 316 may have one or more discrete aisles, such as discrete aisle 320.

In these illustrative examples, discrete aisle 320 may be a combination of seats within seats 318 and spaces 324 located in a row along the aircraft longitudinal axis with a certain pitch. These empty spaces may improve fore and aft passenger traffic, crew operation, and other features in passenger area 314.

Figure 4:
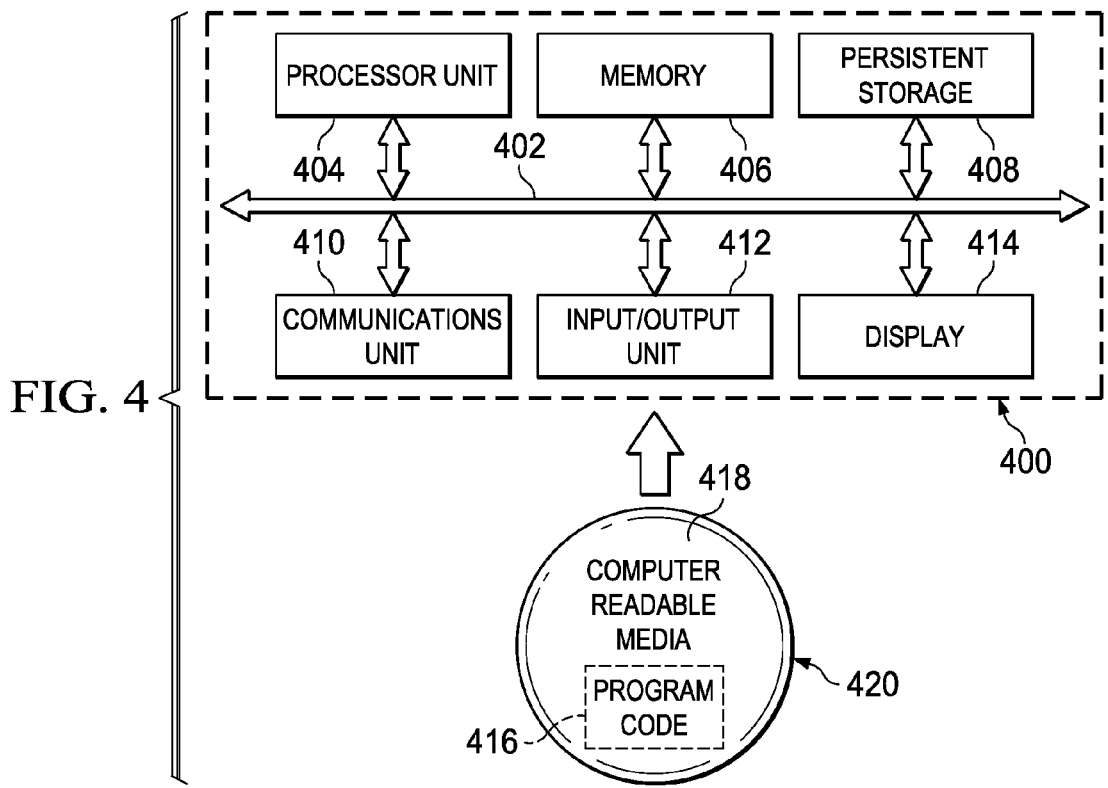
FIG. 4 is a diagram of a data processing system in accordance with an illustrative embodiment.

Turning now to FIG. 4, a diagram of a data processing system is depicted in accordance with an illustrative embodiment of the present invention. Data processing system 400 is an example of a data processing system that may be used to design and analyze passenger area 314, fuselage 302, and other suitable features for aircraft 300 in FIG. 3.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, without limitation, a random access memory or any other suitable volatile or non-volatile storage device.

Persistent storage 408 may take various forms depending on the particular implementation. For example, without limitation, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, without limitation, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, without limitation, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 406 or a cache such as found in an interface and memory controller hub that may be present in communications fabric 402.

Figure 5:
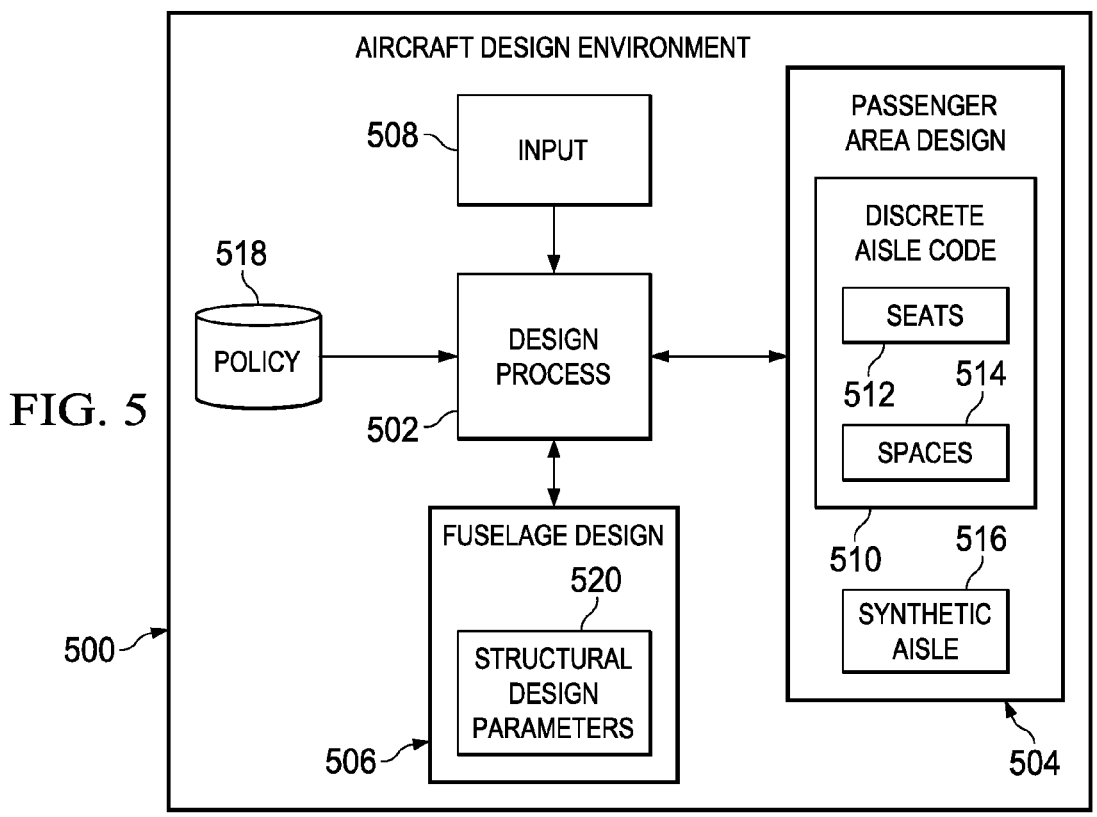
FIG. 5 is a diagram illustrating an aircraft design environment in accordance with an advantageous embodiment.

With reference now to FIG. 5, a diagram illustrating an aircraft design environment is depicted in accordance with an advantageous embodiment. In this example, aircraft design environment 500 is an example of a design environment that may be executed within a data processing system such as, for example, without limitation, data processing system 400 in FIG. 4.

In this example, design process 502 may generate passenger area design 504 and/or fuselage design 506 based on input 508. Input 508 may specify various design goals or parameters. For example, input 508 may include, for example, without limitation, passenger density, number of passengers, aircraft size, and other suitable input. In some advantageous embodiments, input 508 may include fuselage design 506.

With this input, design process 502 may create passenger area design 504. Passenger area design 504 may describe the passenger area within a passenger cabin such as, for example, without limitation, passenger area 314 in FIG. 3.

Additionally, passenger area design 504 may also be created using policy 518. Policy 518 is a set of rules and may include data used to create passenger area design 504. For example, without limitation, policy 518 may specify a maximum amount of time that is allowed for a passenger to reach an exit from any seat within passenger area design 504.

Passenger area design 504 may be described using discrete aisle code 510. Discrete aisle code 510 may describe seats 512 and spaces 514. In this manner, discrete aisle code 510 may describe various configurations, including synthetic aisle 516.

In these examples, passenger area design 504 may include one or more aisles similar to synthetic aisle 516. These types of aisles may be used to optimize or reach desired passenger densities. With the use of discrete aisle code 510, design process 502 may perform analysis on various configurations of seats and spaces, including synthetic aisle 516 to generate passenger area design 504.

Further, with the use of discrete aisle code 510, other analysis may be made with respect to policy 518. For example, design process 502 may identify a maximum amount of time needed by a passenger to reach an exit. This information may be used along with various regulations, rules, and/or policies within policy 518 in creating passenger area design 504 in a manner that obtains a desired passenger density while taking into account policy 518.

In other advantageous embodiments, passenger area design 504 may be part of input 508 and may be used to generate fuselage design 506. In these examples, fuselage design 506 may include structural design parameters 520. Structural design parameters 520 may include, for example, without limitation, a perimeter of the fuselage, the cross-sectional shape of the fuselage, the size of the fuselage, and other suitable parameters. With passenger area design 504 being fixed and/or static, fuselage design 506 may be generated by design process 502.

In yet other advantageous embodiments, design process 502 may vary both passenger area design 504 and fuselage design 506 to obtain optimal performance parameters to meet various goals that may be specified within policy 518. For example, policy 518 may specify particular performance parameters such as, for example, without limitation, drag, aircraft weight, fuselage cross-section shape, and other suitable parameters.

Additionally, policy 518 also may specify a particular passenger density. With parameters or rules being specified for both passenger area design 504 and fuselage design 506, design process 502 may generate an optimal design for the aircraft by varying both passenger area design 504 and fuselage design 506 in an attempt to reach design parameters or thresholds for both designs. A conventional aisle may be coded as $(0)_n$ in discrete aisle code n. Column seats without spaces may be coded as $(1)_n$.

FIGS. 6-9 illustrate examples of discrete aisle code that may be used to describe columns of seats within an aircraft. The discrete aisle code illustrated in these examples is an example of discrete aisle code 510 in FIG. 5.

Figure 6:
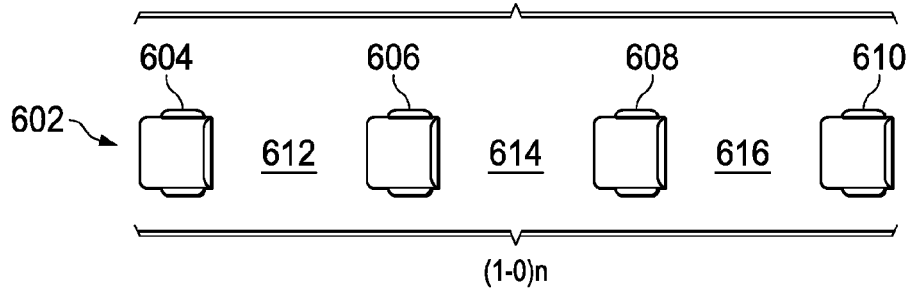
FIG. 6 is a diagram illustrating discrete aisle code in accordance with an advantageous embodiment.

With reference now to FIG. 6 a diagram illustrating discrete aisle code is depicted in accordance with an advantageous embodiment. In these examples, discrete aisle code (DAC) may take the form of a binary stream. This binary stream may define a sequence of seats and spaces for an aisle. This code may define spaces for a conventional aisle and/or a synthetic aisle. A seat may be identified using a 1 and a space may be identified using a 0.

In this example, column 602 may include seats 604, 606, 608, and 610. A column, as used herein, describes passenger seats and spaces along an aircraft longitudinal axis. In other words, a column may be a number of seats and/or spaces present from a forward section to an aft section of an aircraft.

As can be seen, spaces 612, 614, and 616 are also present. This sequence of seats and spaces may be represented with $(1\text{-}0)_n$. In these depicted examples, n may be any number of periods for which a sequence or pattern repeats.

Figure 7:
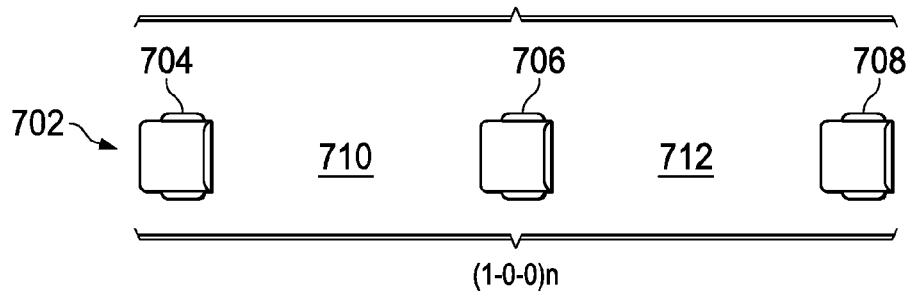
FIG. 7 is a diagram of discrete aisle code in accordance with an advantageous embodiment.

With reference now to FIG. 7, a diagram of discrete aisle code is depicted in accordance with an advantageous embodiment. As can be seen, in this example, column 702 may contain seats 704, 706, and 708. Additionally, space 710 and space 712 may be present. In these examples, space 710 and space 712 each may be defined as two spaces in discrete aisle code because each of these spaces may be long enough for two seats. The discrete aisle code for this illustration may be $(1\text{-}0\text{-}0)_n$.

Figure 8:
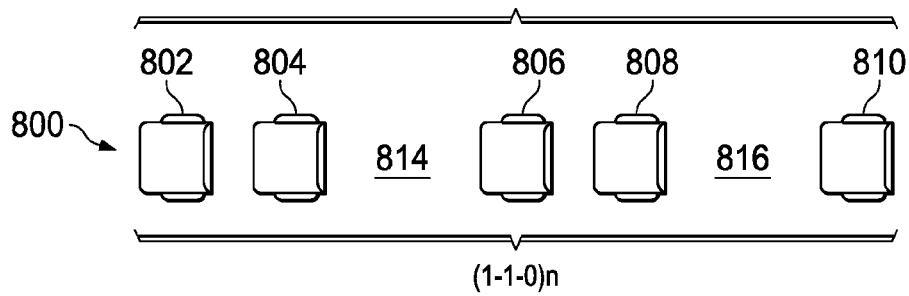
FIG. 8 is a diagram of another example of discrete aisle code in accordance with an advantageous embodiment.

With reference next to FIG. 8, a diagram of another example of discrete aisle code is depicted in accordance with an advantageous embodiment. In this particular example, column 800 may include seats 802, 804, 806, 808, and 810. Further, column 800 also may include space 814 and space 816. This sequence of seats and spaces may be represented as $(1\text{-}1\text{-}0)_n$.

Figure 9:
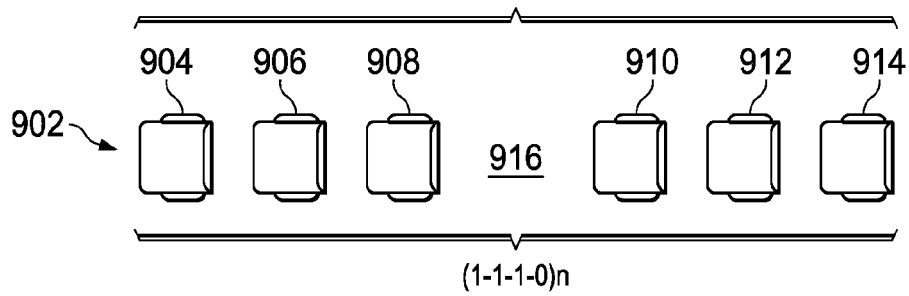
FIG. 9 is a further diagram of discrete aisle code in accordance with an advantageous embodiment.

With reference to FIG. 9, a further diagram of discrete aisle code is depicted in accordance with an advantageous embodiment. In this illustrative example, column 902 may contain seats 904, 906, 908, 910, 912, and 914. Column 902 also may include space 916. This sequence of seats and space in column 902 may be described in discrete aisle code as $(1\text{-}1\text{-}1\text{-}0)_n$.

Figure 10:
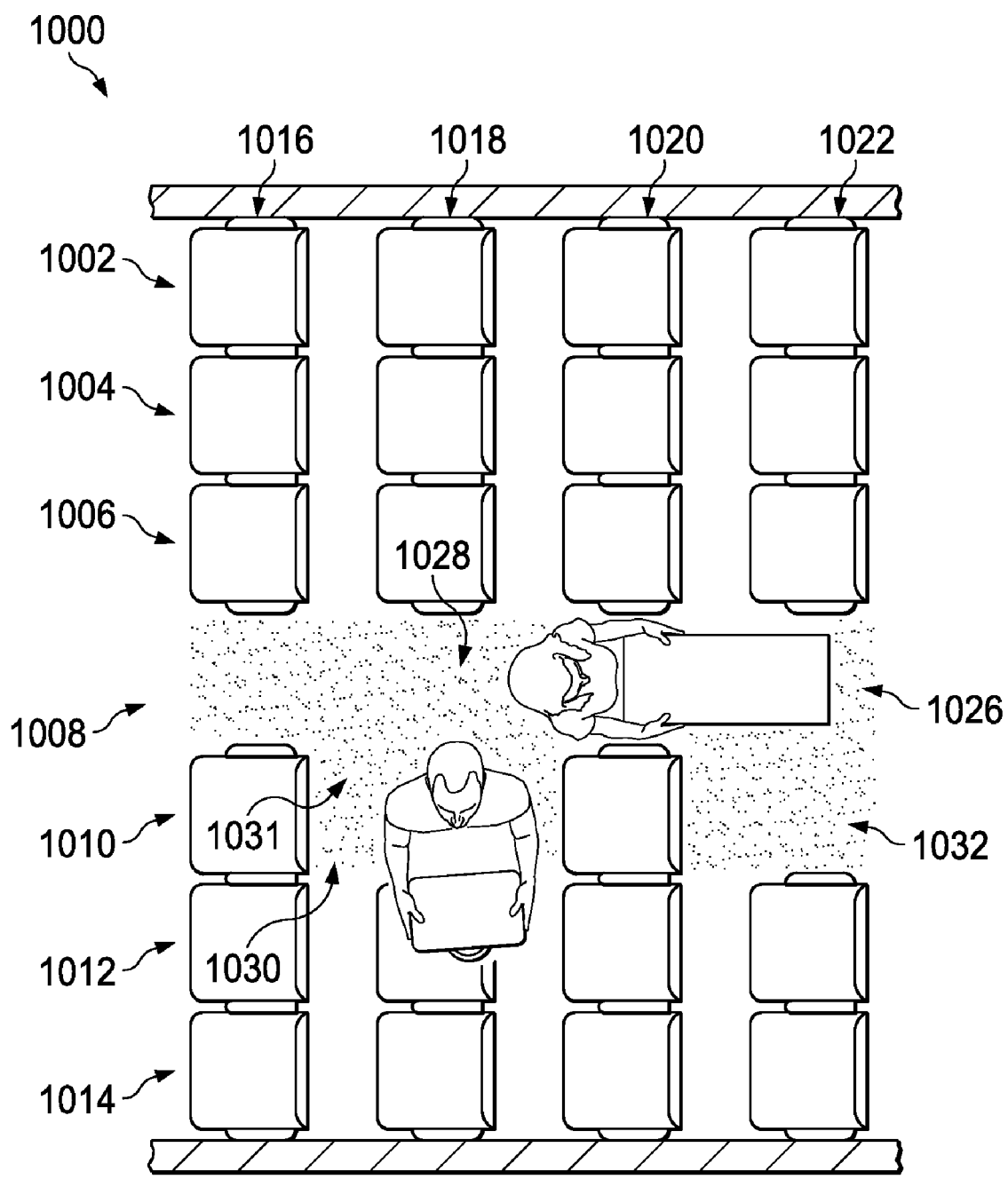
FIG. 10 is a diagram illustrating a passenger area with a synthetic aisle in accordance with an advantageous embodiment.

With reference now to FIG. 10, a diagram illustrating a passenger area with a synthetic aisle is depicted in accordance with an advantageous embodiment. Passenger area 1000 is an example of passenger area 314 in FIG. 3. In this example, passenger area 1000 includes columns 1002, 1004, 1006, 1008, 1010, 1012, and 1014.

Passenger area 1000 also may include rows 1016, 1018, 1020, and 1022. The seating in passenger area 1000 may be staggered on one side with a seat missing on another side to create synthetic aisle 1026. In this example, synthetic aisle 1026 may include conventional aisle 1028, and discrete aisle 1030, which includes spaces 1031 and 1032. In this example, discrete aisle 1030 may be parallel to conventional aisle 1028.

Columns 1002, 1004, 1010, 1012, and 1014 may be described in discrete aisle code as $(1)_n$. Synthetic aisle 1026 may be described in columns 1006 and 1008. Column 1006 may be coded as $(1-0)_n$, while column 1008 may be described as $(0)_n$. Synthetic aisle 1026 may be described using the combination of these two columns and represented as $(1-0)_n/(0)_n$.

Figure 11:
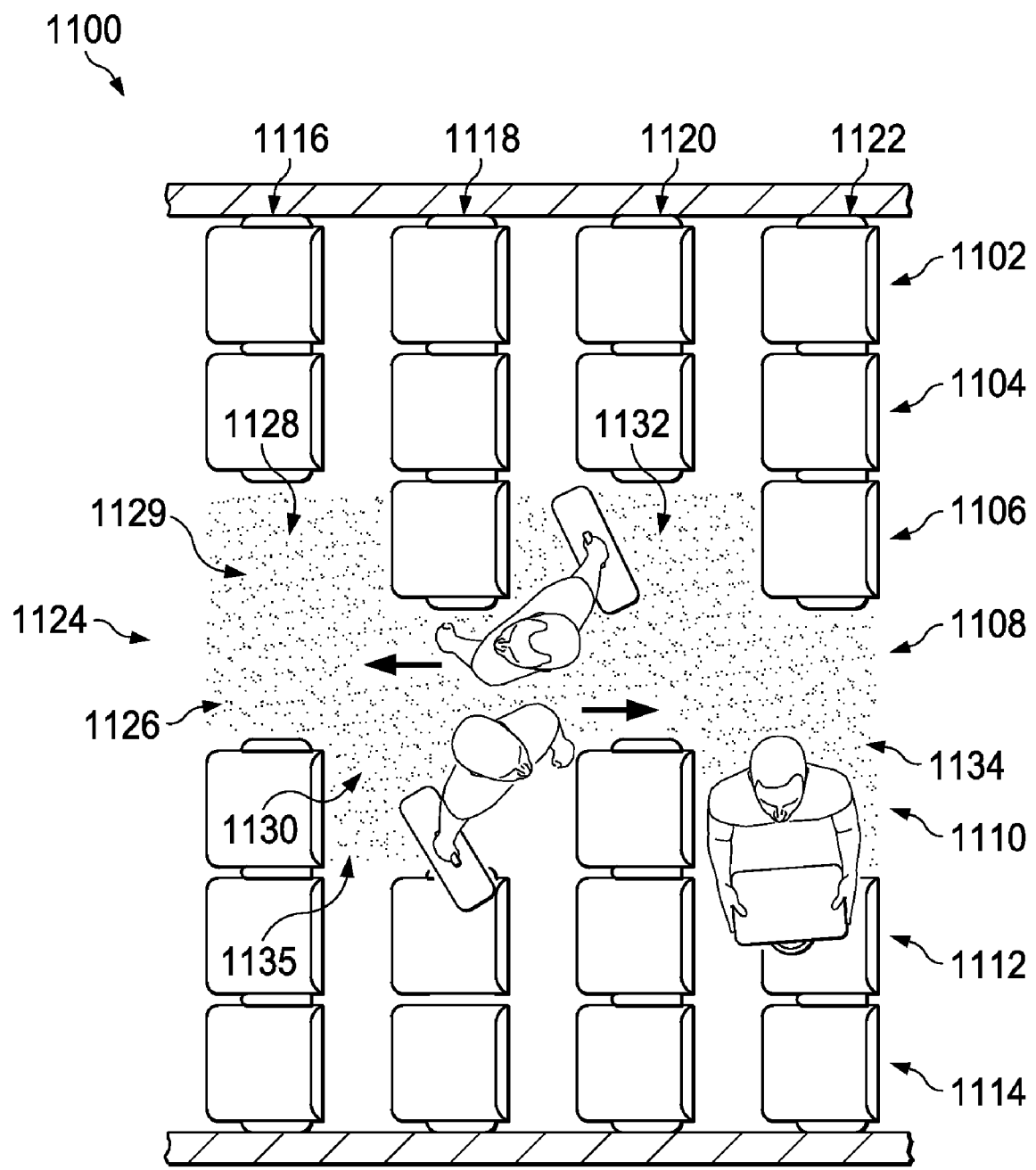
FIG. 11 is a diagram of a passenger area in accordance with an advantageous embodiment.

With reference now to FIG. 11, a diagram of a passenger area is depicted in accordance with an advantageous embodiment. In this example, passenger area 1100 is an example of passenger area 314 in FIG. 3.

Passenger area 1100 may include columns 1102, 1104, 1106, 1108, 1110, 1112, and 1114. Passenger area 1100 also may include rows 1116, 1118, 1120, and 1122. In this example, synthetic aisle 1124 may be described using the following coding $(1-0)_n/(0)_n(0-1)_n$.

Synthetic aisle 1124 may include conventional aisle 1126, and discrete aisle 1130. Discrete aisles 1128 may include spaces 1129 and 1132. Discrete aisles 1130 may include spaces 1133 and 1134. Discrete aisle 1128 and discrete aisles 1130 may be parallel to conventional aisle 1126. These discrete aisles may be created by leaving out seats by convention aisle 1126.

Figure 12:
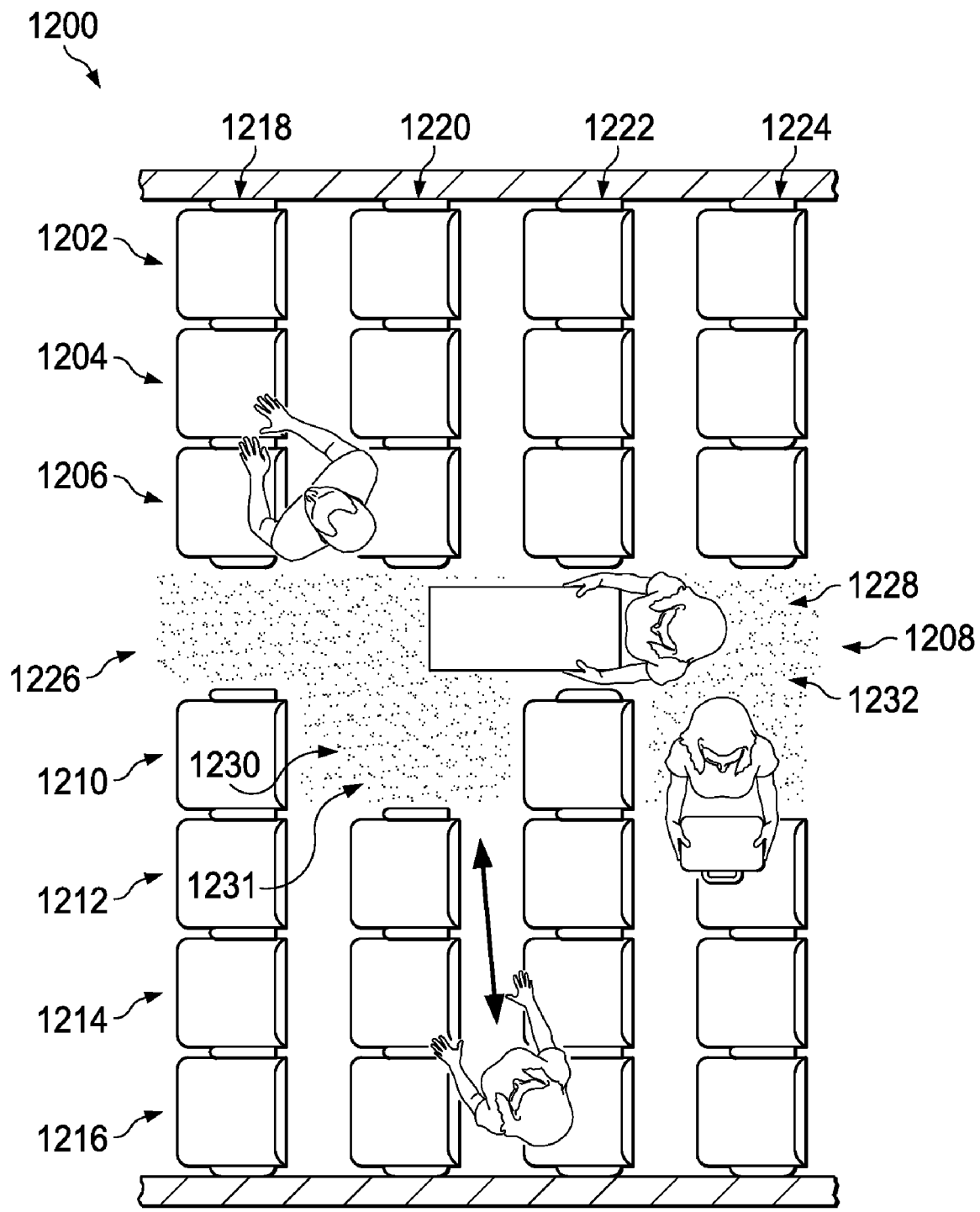
FIG. 12 is a diagram illustrating a passenger area with a synthetic aisle in accordance with an advantageous embodiment.

With reference now to FIG. 12, a diagram illustrating a passenger area with a synthetic aisle is depicted in accordance with an advantageous embodiment. Passenger area 1200 is an example of one implementation for passenger area 314 in FIG. 3.

In this example, passenger area 1200 includes columns 1202, 1204, 1206, 1208, 1210, 1212, 1214, and 1216. Passenger area 1200 also includes rows 1218, 1220, 1222, and 1224. Synthetic aisle 1226 may be present in passenger area 1200. Synthetic aisle 1226 may be formed from conventional aisle 1228 and discrete aisle 1230. Discrete aisle 1230 may include space 1231 and space 1232. Discrete aisle 1230 may be parallel to conventional aisle 1228. Synthetic aisle 1226 may be described in discrete aisle code as $(0)_n/(1-0)_n$.

In this illustrative example, rows 1218 and 1222 may include four continuous seats rather than three continuous seats. Four continuous seats are referred to as quad seats, in these examples. This type of seat configuration may be used because of the presence of discrete aisle 1230 within synthetic aisle 1226. With this type of configuration, no passenger may need to go past more than two seats to reach synthetic aisle 1226.

Figure 13:
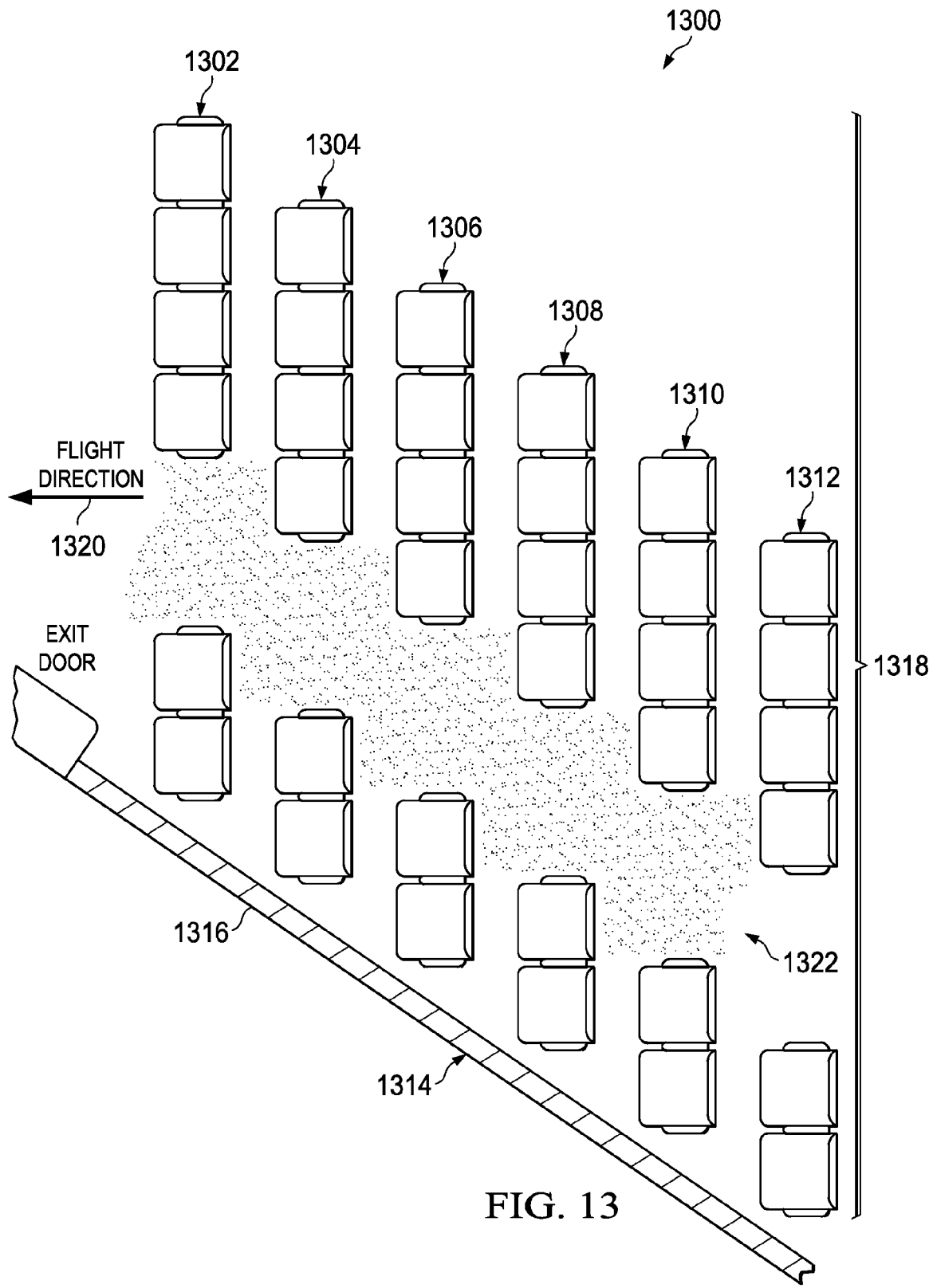
FIG. 13 is a diagram illustrating a synthetic aisle for an unconventional airplane in accordance with an advantageous embodiment.

With reference now to FIG. 13, a diagram illustrating a synthetic aisle for unconventional airplane payload configuration is depicted in accordance with an advantageous embodiment. In this example, a portion of passenger area 1300 is illustrated. In this example, passenger area 1300 may include rows 1302, 1304, 1306, 1308, 1310, and 1312. In this example, wall 1314 may follow wing leading edge 1316. In these examples, seats 1318 in passenger area 1300 may face forward in flight direction 1320. In this example, synthetic aisle 1322 may be described as follows: $[0-(1)_4/(0)_2-(1)_4/(0)_3-(1)_4/0-1-(0)_2-(1)_3/[(1)_2-(0)_2-(1)_2]_n$.

Figure 14:
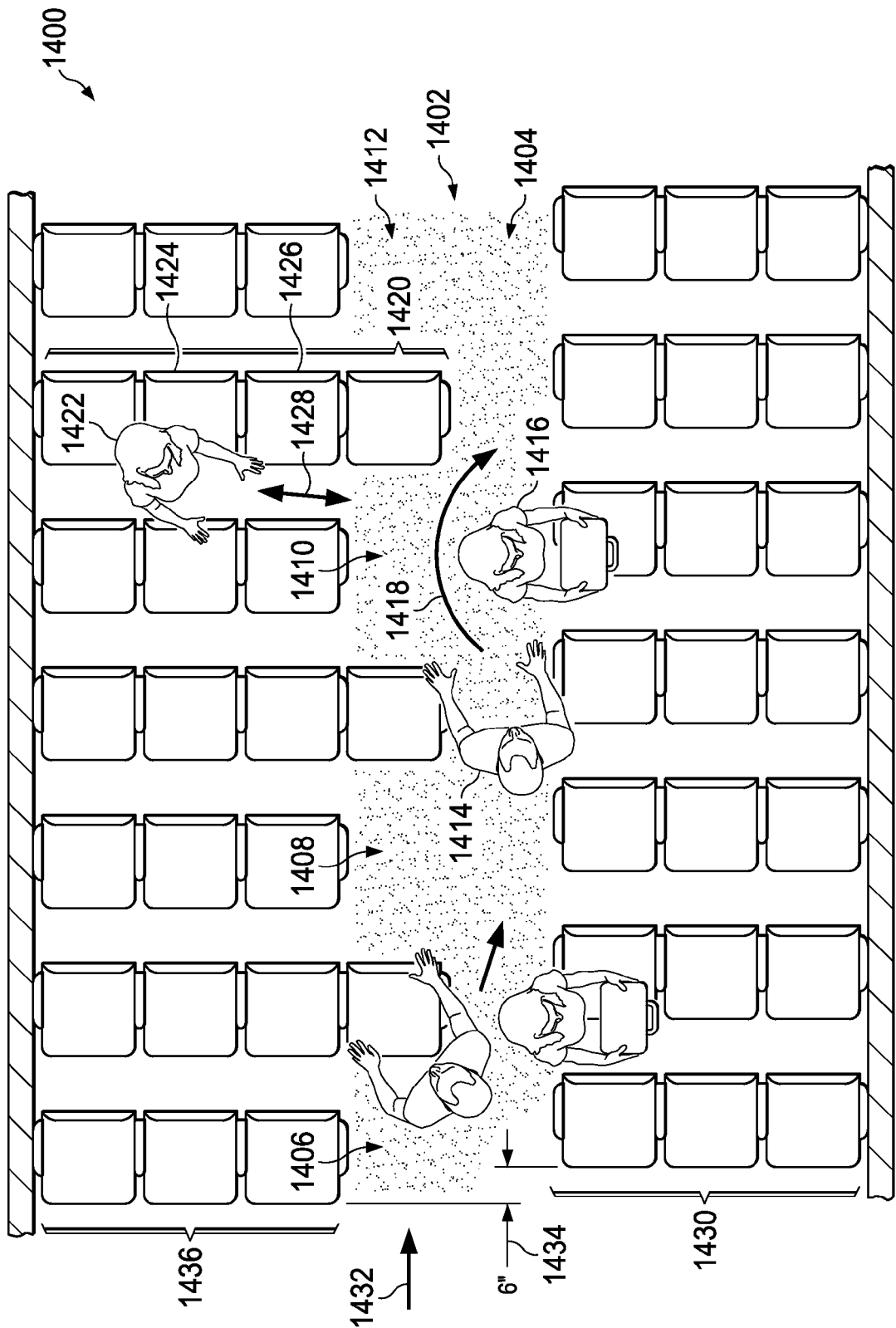
FIG. 14 is a diagram illustrating traffic flow with a synthetic aisle with a longitudinal offset between left and right sides of the passenger cabin in accordance with an advantageous embodiment.

With reference now to FIG. 14, a diagram illustrating traffic flow with a synthetic aisle is depicted in accordance with an advantageous embodiment. Passenger area 1400 may be an example of one implementation for passenger area 314 in FIG. 3.

In this example, passenger area 1400 may include synthetic aisle 1402. Synthetic aisle 1402, in this example, may be described in discrete aisle code as $(1-0)_n/(0)_n$. In this example, synthetic aisle 1402 may include conventional aisle 1404 and discrete aisles 1406, 1408, 1410, and 1412.

As can be seen, with synthetic aisle 1402, traffic flow problems between passengers and flight attendants may be reduced as compared to the use of only conventional aisle 1404. This reduction of traffic flow problems may occur in various situations such as, for example, without limitation, unloading overhead stow bins, loading overhead stow bins, and other suitable situations.

Another situation may be, for example, without limitation, when a passenger pauses in the aisle, blocking passengers behind the passenger, while clearing an obstruction in a seat before entering the seat row to occupying the seat. Passenger 1414 may more easily move around passenger 1416 as shown by arrow 1418 with the availability of discrete aisle 1410 within synthetic aisle 1402.

Further, quad seat installation, as shown by section 1420, may be made possible even with the requirements that a passenger pass no more than two seats to reach an aisle. In this example, passenger 1422 only passes two seats, seats 1424 and 1426, as shown by arrow 1428 to reach synthetic aisle 1402. Also, in these illustrative examples, seats within section 1430 may be offset in the direction of arrow 1432 to a certain distance, which may be less or equal to a half seat pitch as shown in section 1434 as compared to seats within section 1436. This type of offset also may provide additional room for traffic flow within passenger area 1400.

Figure 15:
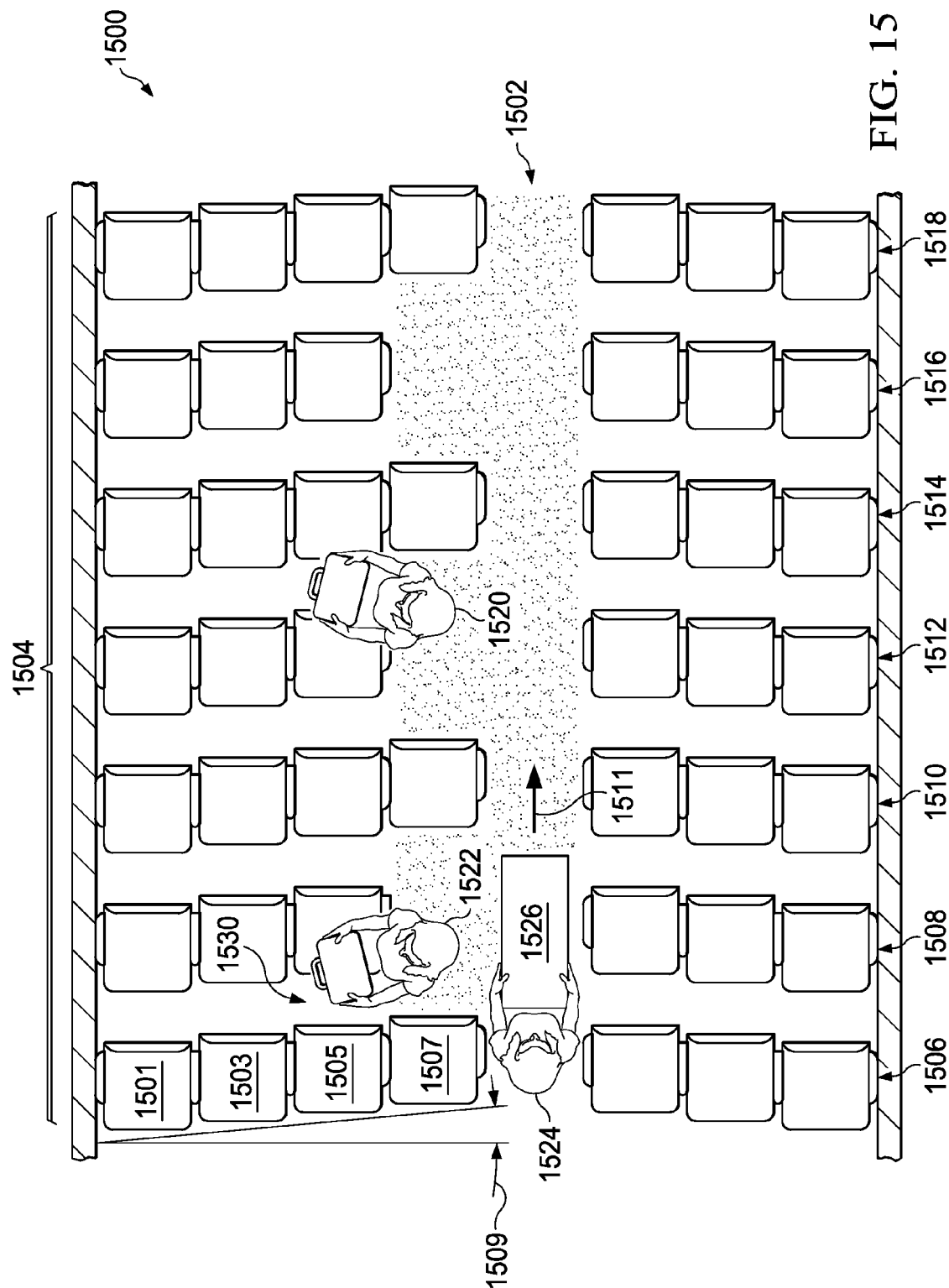
FIG. 15 is a diagram illustrating a synthetic aisle with staggered seat rows in accordance with an advantageous embodiment.

With reference now to FIG. 15, a diagram illustrating a synthetic aisle with staggered seat rows is depicted in accordance with an advantageous embodiment. Passenger area 1500 is another example of an implementation for passenger area 314 in FIG. 3.

In this example, passenger area 1500 may include synthetic aisle 1502. As can be seen, in this example, seats 1504 are all staggered within rows 1506, 1508, 1510, 1512, 1514, 1516, and 1518. For example, seats 1501, 1503, 1505, and 1507 in row 1506 may be staggered relative to each other. The amount of staggering may be relative to an angle such as, for example, without limitation, angle 1509. Angle 1509 may vary depending on the amount of staggering that may be desired within a section of seats.

In this example, seat 1503 may be staggered farther back than seat 1501 in the direction of arrow 1511. Seat 1505 also may be staggered relative to seat 1501 and seat 1503. Seat 1507 may be further staggered with respect to seats 1501, 1503, and 1505 in this example. The other seats in the other rows may be staggered in a similar fashion.

In this example, passenger 1520 may be able to access belongings in an overhead stow bin (not shown), while flight attendant 1524 provides a meal and/or beverage service using cart 1526 in synthetic aisle 1502 without being in the way. Other passengers such as, for example, without limitation, passengers 1520 and 1522 may be able to move around cart 1526. For example, without limitation, passenger 1528 may be able to return to seat 1530 through synthetic aisle 1502.

Figure 16:
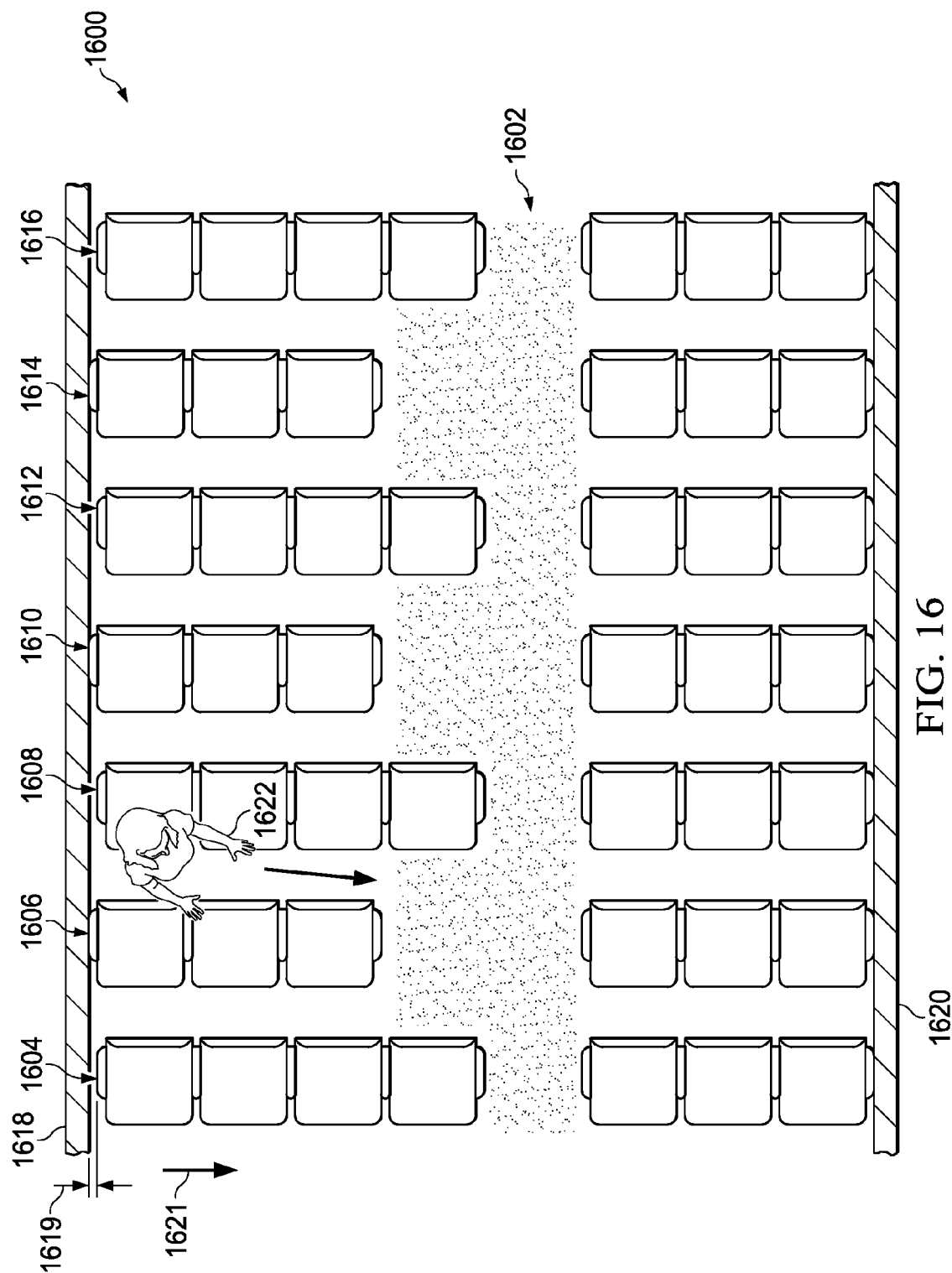
FIG. 16 is a diagram of an example of a synthetic aisle in a passenger area with quads wall offset in accordance with an advantageous embodiment.

With reference now to FIG. 16, a diagram of an example of a synthetic aisle in a passenger area is depicted in accordance with an advantageous embodiment. Passenger area 1600 may be another example of an implementation for passenger area 314 in FIG. 3.

In this example, passenger area 1600 may include synthetic aisle 1602. In this example, passenger area 1600 may include seats in rows 1604, 1606, 1608, 1610, 1612, 1614, and 1616. Rows 1604, 1608, 1612, and 1616 may be offset from wall 1618 in these examples. In this example, rows 1604, 1608, 1612, and 1616 are offset by distance 1619 in the direction of arrow 1621. No offset may be present with respect to wall 1620. Offsets of these rows with quad seats may place passenger 1622 closer to synthetic aisle 1602.

Figure 17:
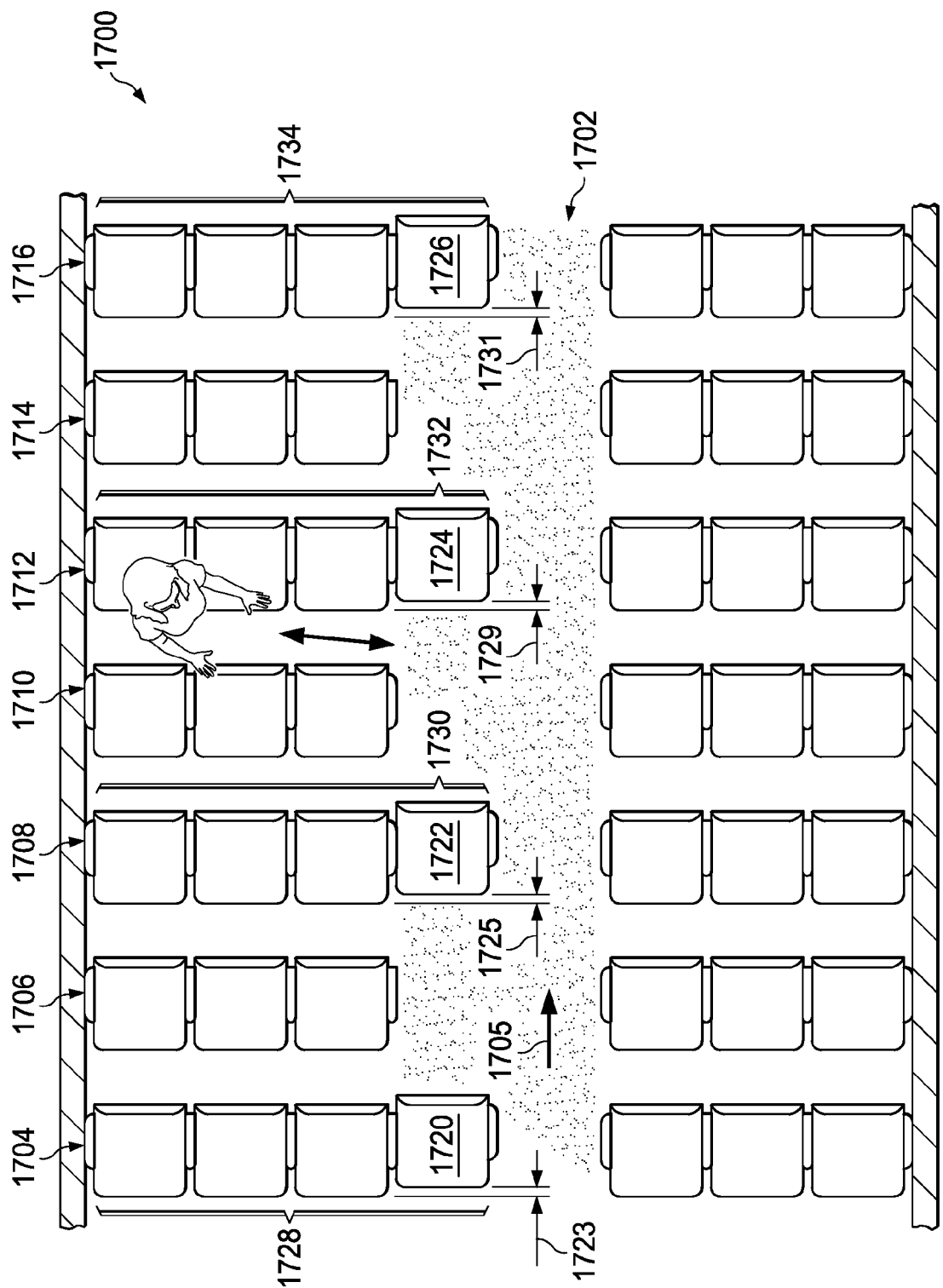
FIG. 17 is a diagram of a synthetic aisle with the aisle seat offset back in quads in accordance with an advantageous embodiment.

With reference now to FIG. 17, a diagram of a synthetic aisle is depicted in accordance with an advantageous embodiment. Passenger area 1700 may be an example implementation for passenger area 314 in FIG. 3. In passenger area 1700, synthetic aisle 1702 may be present.

Passenger area 1700 may include seats in rows 1704, 1706, 1708, 1710, 1712, 1714, and 1716. Seats 1720, 1722, 1724, and 1726 may be staggered or offset in the direction of arrow 1705 from other seats within the rows to provide easier access to synthetic aisle 1702. In these examples, seat 1720 may be offset by distance 1723, seat 1722 may be offset by distance 1725, seat 1724 may be offset by distance 1729, and seat 1726 may be offset by distance 1731. In this example, these offsets may be a rational distance which improves the access for rows 1704, 1708, 1712, and 1716, and should not change the access for rows 1706, 1710, and 1714.

As illustrated, seat 1720 may be offset within quad seat assembly 1728. Seat 1722 may be offset within quad seat assembly 1730. Seat 1724 may be offset within quad seat assembly 1732, and seat 1726 may be offset within quad seat assembly 1734.

Figure 18:
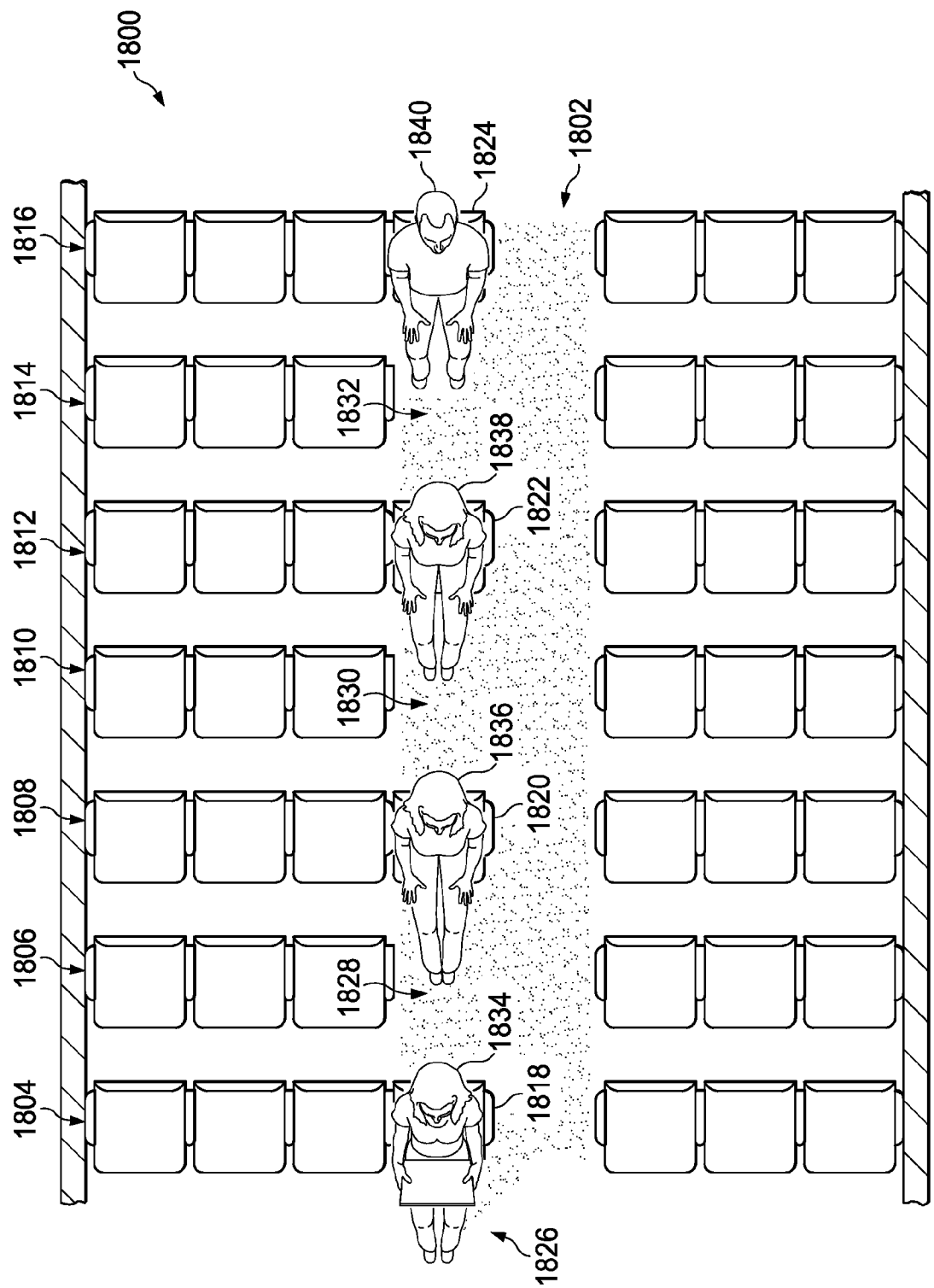
FIG. 18 is a diagram illustrating a synthetic aisle used to create premium seats in accordance with an advantageous embodiment.

With reference now to FIG. 18, a diagram illustrating a synthetic aisle used to create premium seats is depicted in accordance with an advantageous embodiment. Passenger area 1800 may be another example of an implementation for passenger area 314 in FIG. 3.

In this example, passenger area 1800 includes synthetic aisle 1802. In this example, passenger area 1800 may have seats in rows 1804, 1806, 1808, 1810, 1812, 1814, and 1816. Premium seating may be provided in seats 1818, 1820, 1822, and 1824 through the use of discrete aisles 1826, 1828, 1830, and 1832 to provide extra leg space for passengers 1834, 1836, 1838, and 1840.

Figure 19:
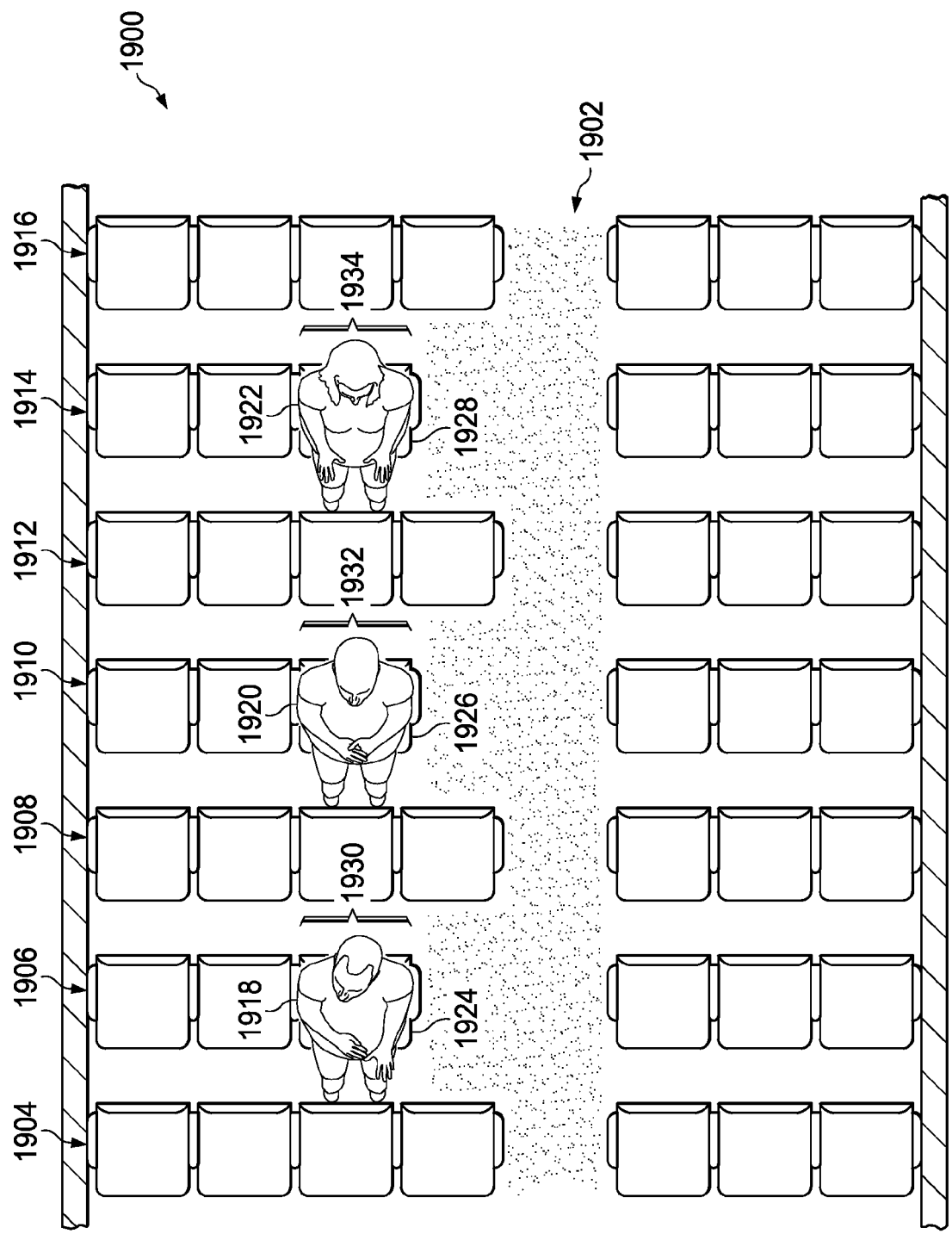
FIG. 19 is a diagram of a synthetic aisle with premium seats in accordance with an advantageous embodiment.

With reference now to FIG. 19, a diagram of a synthetic aisle with premium seats is depicted in accordance with an advantageous embodiment. Passenger area 1900 may be an example of one implementation for passenger area 314 in FIG. 3.

In this example, passenger area 1900 may include synthetic aisle 1902. Passenger area 1900 may include seats in rows 1904, 1906, 1908, 1910, 1912, 1914, and 1916. In this example, seats 1918, 1920, and 1922 may be premium seats with wider seat cushions. In these examples, seats 1918, 1920, and 1922 may provide a seat cushions 1924, 1926, and 1928.

Seat cushion 1924 may have width 1930, seat cushion 1926 may have width 1932, and seat cushion 1928 may have width 1934. These widths may be increased to, for example, without limitation, 21.1 inches, that may cover 99 percent of hip width, to 22.1 inches, that may cover 99.5 percent of hip width and to 24.8 inches, which may cover 99.9 percent of hip width versus other seats within passenger area 1900.

As can be seen, from the different illustrative examples, the use of synthetic aisles may reduce congestion in an aircraft, as compared to the use of only conventional aisles. The different discrete aisles may allow for passengers to move around other passengers and/or carts to move from one portion of the passenger area to another portion of the passenger area.

Figure 20:
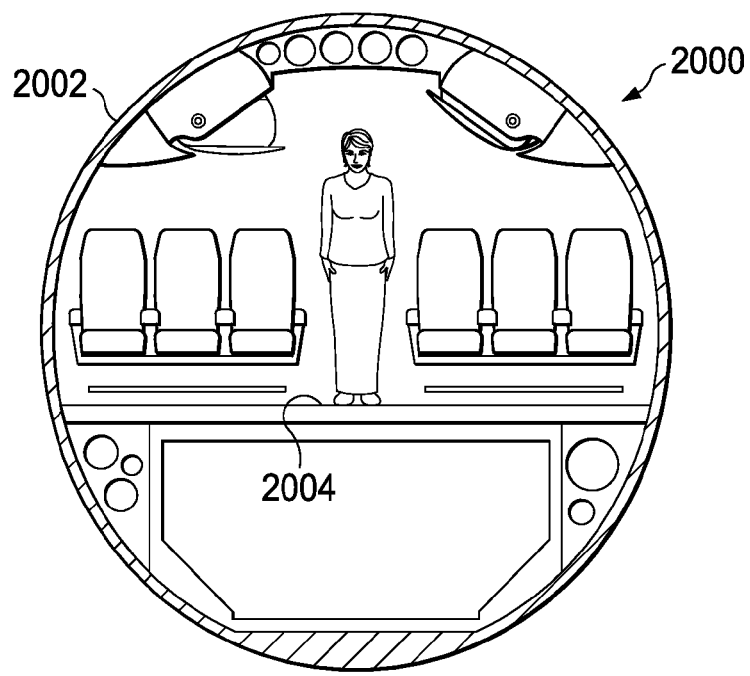
FIG. 20 is a diagram illustrating a cross-sectional view of a conventional fuselage in accordance with an advantageous embodiment.
Figure 21:
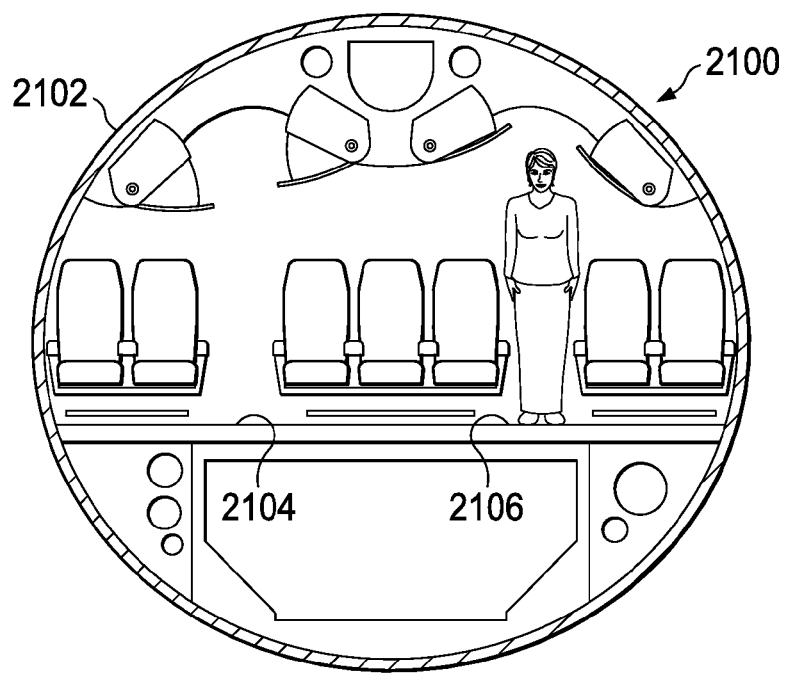
FIG. 21 is a diagram illustrating a fuselage with dual conventional aisles in accordance with an advantageous embodiment.

FIGS. 20-22 are diagrams illustrating different fuselage cross-sections. With reference now to FIG. 20, a diagram illustrating a cross-sectional view of a conventional fuselage is depicted in accordance with an advantageous embodiment. In this example, cross-section 2000 of six abreast single aisle fuselage 2002 may have an optimal shape, as close as possible to a circular in shape. In this example, aisle 2004 may be a conventional aisle.

Conventional designs to increase passenger density may require changes in the shape of cross-section 2000. These changes may, for example, without limitation, include changing cross-section 2000 to have a more oval shape. The oval shape may be wider and/or taller with respect to a circular shape. This type of shape may increase passenger density for conventional aisle designs, but may require additional or larger components or sections to resist internal air pressure unlike a more circular shape for cross-section 2000. This pressure may cause, for example, without limitation, stresses in the fuselage structure, such as hoop stress.

With reference now to FIG. 21, a diagram illustrating a seven abreast fuselage with dual conventional aisles is depicted in accordance with an advantageous embodiment. In this example, cross-section 2100 in fuselage 2102 is more oval in shape as compared to cross-section 2000 in FIG. 20. More specifically, cross-section 2100 may be wider with respect to a horizontal orientation.

In fuselage 2102, dual aisles 2104 and 2106 may be present to increase the number of seats that may be placed in rows and to provide better passenger traffic flow. In this manner, an increase in passenger seating may be achieved. This type of design, however, may require additional weight for structural components needed to resist internal air pressure on fuselage 2102. These pressures may cause, for example, without limitation, hoop stress and/or other loads in fuselage structure 2102.

Figure 22A:
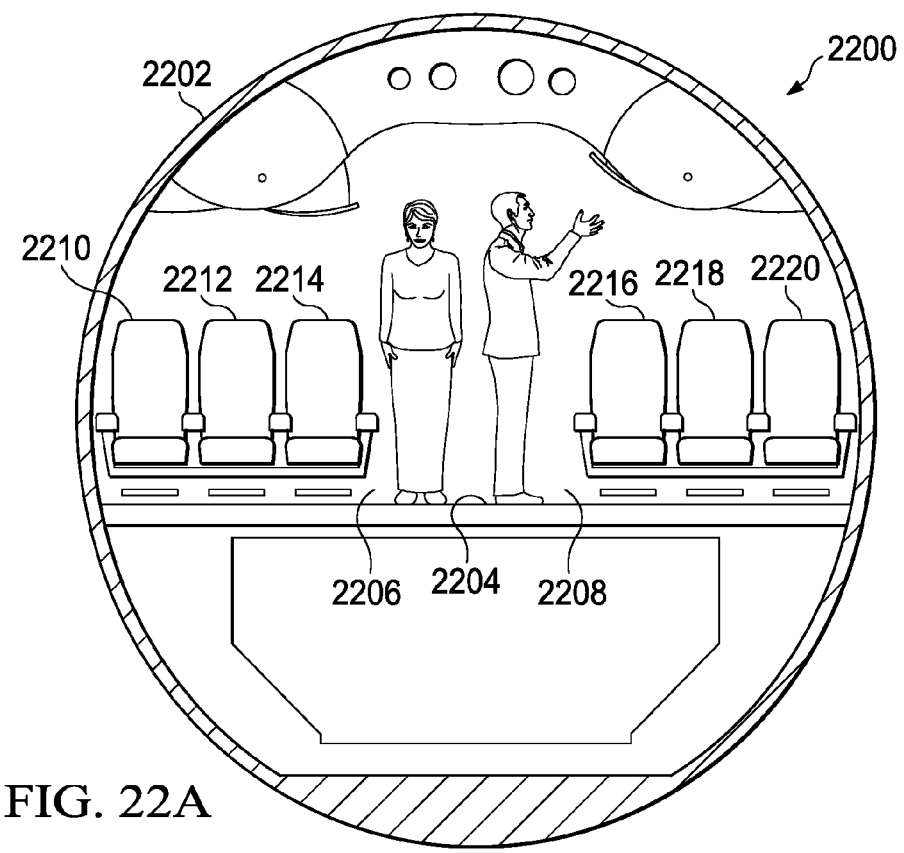
FIGS. 22A and 22B are diagrams of a fuselage designed with synthetic aisles in accordance with an advantageous embodiments.
Figure 22B:
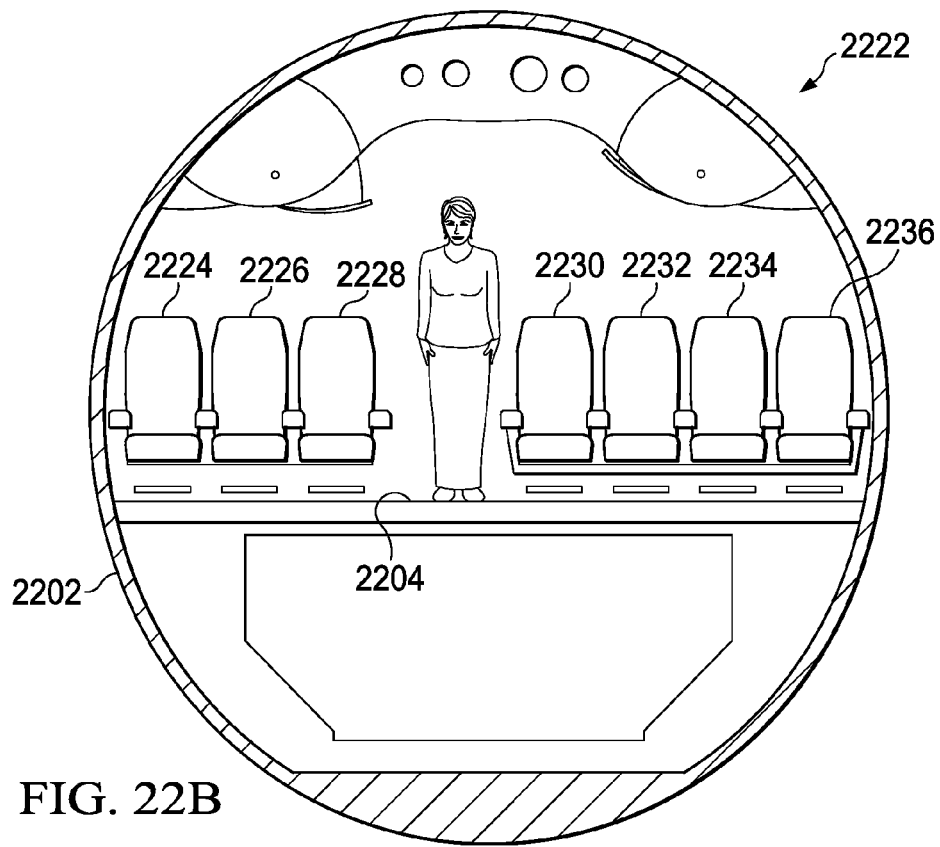

With reference to FIGS. 22A and 22B, a diagram of a fuselage designed with synthetic aisles is depicted in accordance with an advantageous embodiment. In this example, cross-section 2200 of fuselage 2202 is shown in which synthetic aisle 2204 may be present. With the use of synthetic aisle 2204, increased passenger density may be made with less deviation from an optimal circular shape for fuselage 2202.

In cross section 2202, synthetic aisle 2204 includes conventional aisle 2206, as well as discrete aisle 2208. In this cross section, six seats, seats 2210, 2212, 2214, 2216, 2218, and 2220, may be seen. In cross section 2222 of fuselage 2202, only conventional aisle 2206 within synthetic aisle 2204 may be seen. With this cross section, seven seats, seats 2224, 2226, 2228, 2230, 2232, 2234, and 2236, may be seen. As can be seen, different numbers of seats may be abreast across different cross sections in these examples.

With reference now to FIG. 23, a table illustrating a comparison of data for different cross-sections using different types of aisles is depicted in accordance with an advantageous embodiment. In this example, table 2300 may include rows 2302, 2304, and 2306. Column 2308 in table 2300 may show values 2309 an external perimeter per seat per each cross-section. As the perimeter of the cross-section becomes smaller, less parasite drag may be present. Column 2310 may show values 2311 a non-circular merit height-to-weight ratio subtracted from one as percentages. This value also may be referred to as eccentricity and may identify the variance of the fuselage cross-section from a circle. The values indicate the variance from a circle.

Values 2311 in column 2310 may be calculated as (1-h/w) *100 in which w may be the fuselage width and h may be the fuselage height and Increasing numbers for values 2311 means that the fuselage stretches more in the horizontal direction, while decreasing numbers for values 2311 means that the fuselage stretches more in the vertical direction.

For example, without limitation, 8.0 in row 2304 may mean that cross section 2100 in fuselage 2102 in FIG. 21 stretches in the horizontal direction and −5.9 in row 2302 may mean that cross section 2000 in fuselage 2002 stretches in the vertical direction. A value of 0 may indicate a circular shape without any stretching. When a shape of a fuselage is more oval is may be undesirable for the shape to deform to a circular shape when the fuselage is put under pressurization.

Column 2312 may provide values 2313 for a frontal area. A smaller frontal area may be more desirable because of less air resistance on the aircraft. An aircraft that has a cross-section that is more circular may be more desirable because of less pressure and/or deformation. The reduction in pressure and/or deformation may be for forces such as, for example, without limitation, loading and/or bending forces. As a result, less structure may be needed to resist pressure as compare to a more oval shape.

As can be seen, in table 2300, the synthetic aisle cross-section in row 2306 may be closer to circular. This type of cross-section may be lighter in pressurization as compared to the cross-section in row 2304. Further, the synthetic aisle cross-section may provide a constant fuselage part with a least wetted area. A wetted area may be the surface area of the fuselage that contributes to the drag component.

Further, the synthetic aisle cross-section may have less frontal area than dual aisle cross-sections and may have frontal area fairly close to a single aisle cross-section. As a result, from a performance perspective, the use of synthetic aisles may allow for structural design parameters to be selected for an aircraft to provide increase performance as compared to aircraft designed without synthetic aisles. In these examples, each of the cross-sections illustrated may be for the same number of seats in passenger area 314 and for the same seat rows pitch.

With reference now to FIG. 24, a flowchart of a process for configuring a passenger area is depicted in accordance with an advantageous embodiment. The process as illustrated in FIG. 24 may be implemented in a software component such as, for example, without limitation, design process 502 in FIG. 5.

The process begins by identifying a design for the aircraft (operation 2400). This design may be, for example, without limitation, fuselage design 506 in FIG. 5 containing structural design parameters 520 in FIG. 5. With this design, the process may configure the passenger area using a set of synthetic aisles to meet a desired passenger density for the design (operation 2402), with the process terminating thereafter. In operation 2402, the process may generate a design such as, for example, without limitation, passenger area design 504 in FIG. 5. As used herein, a set refers to one or more items. A set of synthetic aisles may be one or more synthetic aisles in these examples.

In operation 2402, the process may take in to account rules and/or regulations and policy in creating the desired passenger density. In some examples, the desired passenger density may be a value. In other advantageous embodiments, the desired passenger density may be, for example, without limitation, a maximum passenger density that may be obtained for the design of the aircraft.

With reference now to FIG. 25, a flowchart of a process for designing an aircraft is depicted in accordance with an advantageous embodiment. The process illustrated in FIG. 25 may be implemented in a software component such as, for example, without limitation, design process 502 in FIG. 5.

The process may begin by varying a set of structural design parameters for a fuselage of the aircraft (operation 2500). The process also may vary the design of the passenger area in which a set of synthetic aisles is used to increase passenger density (operation 2502). In this example, operation 2500 and operation 2502 may be performed concurrently or in conjunction with each other to reach or move towards design goals for the fuselage and/or the passenger area.

A determination may be made as to whether the design goals have been met for the process (operation 2504). If the design goals have been met, the process may terminate with a fuselage design and a passenger area design being created. Otherwise, the process may return to operation 2500 to further vary parameters in an attempt to reach the design goals.

In these examples, the design goals may be, for example, without limitation, a particular passenger density, a selected weight for the fuselage, a particular level of drag for the fuselage, a desired shape for the cross-section of the fuselage, and other suitable design goals.

The different advantageous embodiments can take the form of an entirely hardware embodiment, an entirely software embodiment, or an embodiment containing both hardware and software elements. Some embodiments are implemented in software, which includes but is not limited to forms, such as, for example, without limitation, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for configuring an aircraft, the method comprising:
   identifying a design for the aircraft;
   positioning an aisle along a length of a fuselage of the aircraft;
   configuring a first set of rows of seats on a first side of the aisle, the set of rows comprising rows of three seats;
   configuring a second set of rows of seats on a second side of the aisle, the second set of rows comprising alternating rows of four seats and rows of three seats, such that the rows of three seats define an empty space proximate the aisle; and
   configuring a passenger area to meet a desired passenger density for the design responsive to a policy, wherein the policy specifies at least one of a seat width and an orientation for the seats.

2. The method of claim 1, wherein the policy specifies at least one of a maximum time to reach an exit from any seat within the passenger area and a pitch for seats.

3. The method of claim 1, wherein the desired passenger density is a maximum passenger density.

4. The method of claim 1, wherein the configuring step comprises:
   selecting a sequence of seats and spaces to meet the desired passenger density.

5. The method of claim 1, wherein a configuration of seats in the passenger area are described using a discrete aisle code.

6. The method of claim 1, wherein the desired passenger density is one of a selected density and a maximum passenger density for the design on the aircraft.

7. The method of claim 1 wherein a configuration includes at least one row of four seats wherein three seats have a substantially similar alignment and a fourth seat is offset from the three seats.

8. The method of claim 1 wherein a configuration includes at least one row of three seats wherein two seats have a substantially similar alignment and a third seat, proximate an aisle, is wider than the two seats.

9. The method of claim 1 wherein a configuration includes at least one row of seats offset from a fuselage wall.

10. The method of claim 1 wherein a configuration includes alternating rows of three seats and four seats on a first side of a central aisle and rows of three seats on a second side of the central aisle, wherein each of the sets of seats includes a first seat positioned substantially proximate a wall of the fuselage.

11. A method for configuring an aircraft, the method comprising:
    varying a set of structural design parameters for a fuselage of the aircraft responsive to a set of performance parameters including an area of a cross section of the fuselage;
    positioning a single aisle along a length of a fuselage of the aircraft;
    configuring a first set of rows of seats on a first side of the aisle, the set of rows comprising rows of three seats; and
    configuring a second set of rows of seats on a second side of the aisle, the second set of rows comprising alternating rows of four seats and rows of three seats, such that the rows of three seats define an empty space proximate the aisle.

12. The method of claim 11, wherein a passenger area has a set number of seats.

13. The method of claim 11, wherein the set of performance parameters includes a shape of a cross section of the fuselage, represented by the equation: $(1-h/w*100)$, where h represents fuselage height and w represents fuselage width, is between about −5 to about 5.

14. The method of claim 11, wherein the varying step is performed to meet a set of design goals for at least one of a passenger density and a set of performance parameters for the fuselage.

15. An aircraft comprising:
    a fuselage;
    a passenger area within the fuselage;
    a plurality of seats in the passenger area;
    a conventional aisle along a length of the fuselage; and
    a discrete aisle in the passenger area, positioned proximate the conventional aisle, wherein the discrete aisle includes a space defined between alternating rows of seats wherein a first row of alternating seats has our seats and a second row of alternating seats has three seats.

16. The vehicle of claim 15 wherein a configuration of the seats includes alternating rows of three seats and four seats on a first side of a central conventional aisle and rows of three seats on a second side of the central conventional aisle.

17. A method for configuring an aircraft, the method comprising:
    varying a set of structural design parameters for a fuselage of the aircraft to meet a set of performance parameters;
    positioning a single aisle running substantially along a length of the aircraft;
    configuring a first set of seats on a first side of the aisle, wherein the first set of seats comprises a plurality of rows of three seats;
    configuring a second set of seats on a second side of the aisle, wherein the second set of seats comprises a plurality of rows of four seats alternating with a plurality of rows of three seats, wherein the plurality of rows of three seats in the second set of seats have a substantially similar alignment beginning proximate a wall of the fuselage such that the rows of three seats define an empty space proximate the aisle.

18. The method of claim 17, wherein the step of varying a set of structural design parameters comprises:

varying a fuselage design, wherein a fuselage height to width ratio, represented by the equation: (1-h/w*100), where h represents fuselage height and w represents fuselage width, is between about −5 to about 5.

19. The method of claim 17, wherein the varying is performed to incorporate a set of design goals for a passenger density.

20. An aircraft comprising:
a fuselage;
an aisle positioned along a length of the fuselage;
a first set of rows of seats positioned on a first side of the aisle; and
a second set of rows of seats positioned on a second side of the aisle, the second set of rows of seats comprising alternating rows of n seats and alternating rows of n+1 seats, and wherein the rows of n seats define a space proximate the aisle.

21. The aircraft of claim 20 wherein a fuselage height to width ratio, represented by the equation: (1-h/w*100), where h represents fuselage height and w represents fuselage width, is between about −5 to about 5.

* * * * *